( 12 ) United States Patent
Loeffler

(10) Patent No.: US 10,132,509 B2
(45) Date of Patent: Nov. 20, 2018

(54) FLOW-CONTROL VALVE

(71) Applicant: Oventrop GmbH & Co. KG, Olsberg (DE)

(72) Inventor: Gerhard Loeffler, Olsberg (DE)

(73) Assignee: OVENTROP GMBH & CO. KG, Olsberg (DE)

( * ) Notice: Subject to any disclaimer, the term of this patent is extended or adjusted under 35 U.S.C. 154(b) by 47 days.

(21) Appl. No.: 15/324,831

(22) PCT Filed: Jun. 30, 2015

(86) PCT No.: PCT/DE2015/100267
§ 371 (c)(1),
(2) Date: Jan. 9, 2017

(87) PCT Pub. No.: WO2016/012000
PCT Pub. Date: Jan. 28, 2016

(65) Prior Publication Data
US 2017/0198925 A1    Jul. 13, 2017

(30) Foreign Application Priority Data

Jul. 25, 2014  (DE) .................. 10 2014 110 550

(51) Int. Cl.
*F24D 19/10* (2006.01)
*G05D 7/01* (2006.01)
*G05D 16/06* (2006.01)

(52) U.S. Cl.
CPC ....... *F24D 19/1036* (2013.01); *G05D 7/0106* (2013.01); *G05D 16/06* (2013.01)

(58) Field of Classification Search
CPC ...... G05D 7/005; G05D 7/0106; G05D 16/06; Y10T 137/7722; Y10T 137/7784;
(Continued)

(56) References Cited

U.S. PATENT DOCUMENTS 1,593,648 A * 7/1926 Berger .................. G05D 16/10
137/116.5
3,694,622 A   9/1972 Bentley
(Continued)

FOREIGN PATENT DOCUMENTS

DE    3741676 A     6/1989
EP    2985667 A1 *  2/2016  ............. G05D 7/014
GB    2039344 A  *  8/1980  ........... G05D 7/0106

*Primary Examiner* — Jessica Cahill
(74) *Attorney, Agent, or Firm* — Andrew Wilford

(57) ABSTRACT

A valve has a housing with inlet and outlet ports for a liquid, a connector fitting between the ports, a controller in the connector fitting, and first and second flow regulators in the connector fitting. Connection formations on the connector are engaged by an adjuster acting on the first flow regulator while an actuator acts on the manually operable second flow regulator. The controller maintains a differential pressure constant via the first and second flow regulators. The first flow regulator is downstream of the inlet port in a flow direction, followed by the second flow regulator, the controller, and the outlet port. A spindle axially displaceable in the connector fitting has an actuating part that projects out of the connector fitting and a choke element fastened to the spindle and forming part of the first flow regulator. This spindle extends axially through the controller and the second flow regulator.

9 Claims, 1 Drawing Sheet

(58) Field of Classification Search
CPC ......... Y10T 137/7791; Y10T 137/7808; Y10T 137/8225; F24D 19/1036
See application file for complete search history.

(56) References Cited

U.S. PATENT DOCUMENTS

| | | |
|---|---|---|
| 3,741,676 A | 6/1973 | Silvern et al. |
| 4,655,246 A * | 4/1987 | Phlipot .................. F17C 13/04 137/505.11 |
| 6,062,257 A * | 5/2000 | Wild .................. F24D 19/1015 137/501 |
| 2007/0262279 A1 * | 11/2007 | Marstorp ................ F16K 1/526 251/118 |
| 2010/0170581 A1 | 7/2010 | Loeffler |
| 2010/0170889 A1 | 7/2010 | Keite-Telgenbuescher et al. |
| 2013/0314540 A1 | 11/2013 | Hacker et al. |
| 2015/0034621 A1 | 2/2015 | Timmermann et al. |
| 2016/0139606 A1 | 5/2016 | Loeffler |

* cited by examiner

FLOW-CONTROL VALVE

CROSS REFERENCE TO RELATED APPLICATIONS

This application is the US-national stage of PCT application PCT/DE2015/100267 filed 30 Jun. 2015 and claiming the priority of German patent application 102014110550.8 itself filed 25 Jul. 2014.

FIELD OF THE INVENTION

The invention relates to a control valve for controlling the rate of flow and/or the differential pressure in a liquid-conveying heating or cooling system.

BACKGROUND OF THE INVENTION

Such a valve typically has a housing with at least one inlet port and at least one outlet port for the liquid as well as an interposed connector fitting with a controller, a first flow regulator, and a second flow regulator therein. The connector fitting or parts thereon have connection formations for an adjuster acting on the first flow regulator on the one hand and connection formations for an actuator acting on the manually operable second flow regulator on the other hand, and the controller maintains the differential pressure constant via the first flow regulator and the second flow regulator.

Such a control valve is known, for example, from EP 2 271 969 [U.S. Pat. No. 8,763,632]. In the known control valve, the structural solution provided is such that, in the flow direction of the liquid in a cartridge-like unit from the inlet port, the controller is first installed with a sleeve-shaped flow restriction and subsequently with a flow cross section on which an actuator can act, and then a flow device that can be adjusted by manual actuation.

In such valve combinations, even when an actuator is installed, the flow cross section associated therewith can be adjusted by a handle not concealed by the actuator. This is a crucial advantage.

This advantage is to be maintained with this invention. In the solution according to the prior art, the entire throughput of liquid must first flow through the controller, which necessitates a large-diameter flow passage through the sleeve-shaped flow restriction of the controller. The sleeve-shaped flow restriction is enclosed at one end by a diaphragm that is fixed in portions of the cartridge-like unit. The pressure control of the flow restriction is effected by the diaphragm. In this structural solution, the operative surface, which is determined substantially by the diaphragm diameter and the inside diameter of the sleeve-shaped flow restriction and on which the pressure upstream of and downstream of the two flow regulators can act, is reduced. This surface could only be enlarged if the outside diameter of the valve body were increased substantially.

The operative surface of the valve combination is also limited by the fact that the controller is integrated into the actuating spindle so as to be rotatable relative to the housing together with the valve body and valve seat, which requires at least one additional part between the outer periphery of the diaphragm and the inner wall of the housing. This additional part is practically formed by a wall of an insert in the valve body that receives the controlling parts.

OBJECT OF THE INVENTION

Taking this prior art as a point of departure, it is the object of the invention to provide a control valve of the above-described type that is cost-effective to manufacture and, with relatively small housing dimensions, has a large flow cross section and a large operative surface for the controller so that great actuating forces acting on the controller are also to be achieved.

SUMMARY OF THE INVENTION

To attain this object, the invention proposes that the first flow regulator is downstream of the inlet port in the flow direction, followed by the second flow regulator, the controller, and the outlet port, that an axially displaceable spindle in the connector fitting has an actuating part projecting out of the connector fitting and at least one choke element fastened to the spindle, which choke element is part of the first flow regulator, and that the spindle extends axially through both the controller and the second flow regulator.

Relative to the prior art, the sequence of the arrangement of the controller and the flow regulators has been changed so that, according to the invention, flow through the control valve in the flow direction occurs first through the inlet port, then the first flow regulator, then the second flow regulator, and then the controller and finally the outlet port. In conjunction with the fact that a spindle extending axially in the connector fitting of the valve has an actuating part projecting out of the housing and acting on the first flow regulator and has at least one choke element fastened to the spindle and acting as a part of the first flow regulator and the spindle extends axially through both the controller and the second flow regulator, substantial improvements are achieved. Since the spindle diameter is relatively small and can be selected so as to be small, both a large flow cross section and a large operative surface relative to the controller can be achieved so that even great actuating forces acting on the controller can be achieved without having to enlarge the housing. Instead, the housing can have a slender design and the improved function of the controller can still be achieved.

One especially preferred development is that the second flow regulator is formed by a first disk in the housing or in the connector fitting with at least one first flow opening and a second disk resting against same that can be rotated relative thereto and has a second flow opening, with the flow openings forming one overlapping, adjustable flow cross section.

The flow cross section is not impacted by this design of the second flow regulator, either, with small construction being also achieved by the structural design of the flow regulator. This results particularly from the disk design of the elements having the flow openings. Preferably, the second disk is rotationally coupled with a rotary driver held against rotation in the housing or in the connector fitting, and that the rotary driver, with a handle on the outside of the housing, forms the manually operable knob for adjusting the second flow regulator.

This embodiment provides readily accessible and easy-to-operate adjustment possibilities with a functional construction.

Moreover, the spindle is rotatable and axially displaceable in the housing, engages through the controller in a sealed manner, is axially displaceable on it, engages through the second flow regulator with movement clearance, and is axially displaceable on it and/or held in a sealed manner in the actuator. This, too, promotes the slender design of the control valve.

In particular, the controller consists of a flow restriction axially displaceable on the spindle, and a housing-side seat therefor, with the flow restriction being limitedly displaceable toward and away from the seat so that the cross section of the flow passage can be changed by the controller.

In addition, preferably the flow restriction is coupled with a diaphragm whose edge bead running circumferentially on the outside rests and/or is held liquid-tight against an inner wall of the housing or of the connector fitting.

A provision is also preferably made that the flow restriction of the controller has a seal that rests tightly against the outer surface of the spindle. In this way, strong actuating forces acting on the controller during operation of the control valve are achieved because the diaphragm outside diameter of the outer edge bead is formed such that it corresponds to the greatest possible extent to the inside diameter of the housing or of the connector fitting and, in a preferred embodiment, rests tightly against same, with the inside diameter of the flow restriction of the controller corresponding to the greatest possible extent to the outside diameter of the spindle and preferably resting tightly against same.

As a whole, what is achieved by this is that the controller has a large operative surface on whose upper and/or lower side the pressure of the flowing medium can act in the flow direction upstream of the first flow regulator and/or the pressure can act downstream of the second controller so that high actuating forces can be generated. For this purpose, it is also beneficial for the seat of the controller and the first disk cooperating with the rotatable second disk to be integral.

In addition, it is especially preferred if the pressurized liquid flowing through the control valve between the inlet port and the first flow regulator is conducted via a first pressure passage formed in the housing and/or connector fitting to one side of the controller or of a diaphragm of this controller, and if the pressure prevailing between the second flow regulator and the controller is applied to the other side of the controller or of the diaphragm of this controller through a second pressure passage, with the second pressure passage being formed in a flow restriction of the controller that is between the second flow regulator and the diaphragm.

BRIEF DESCRIPTION OF THE DRAWING

An illustrated embodiment of a control valve according to the invention is illustrated in the drawing and described in further detail below.

SPECIFIC DESCRIPTION OF THE INVENTION

Figure 1:
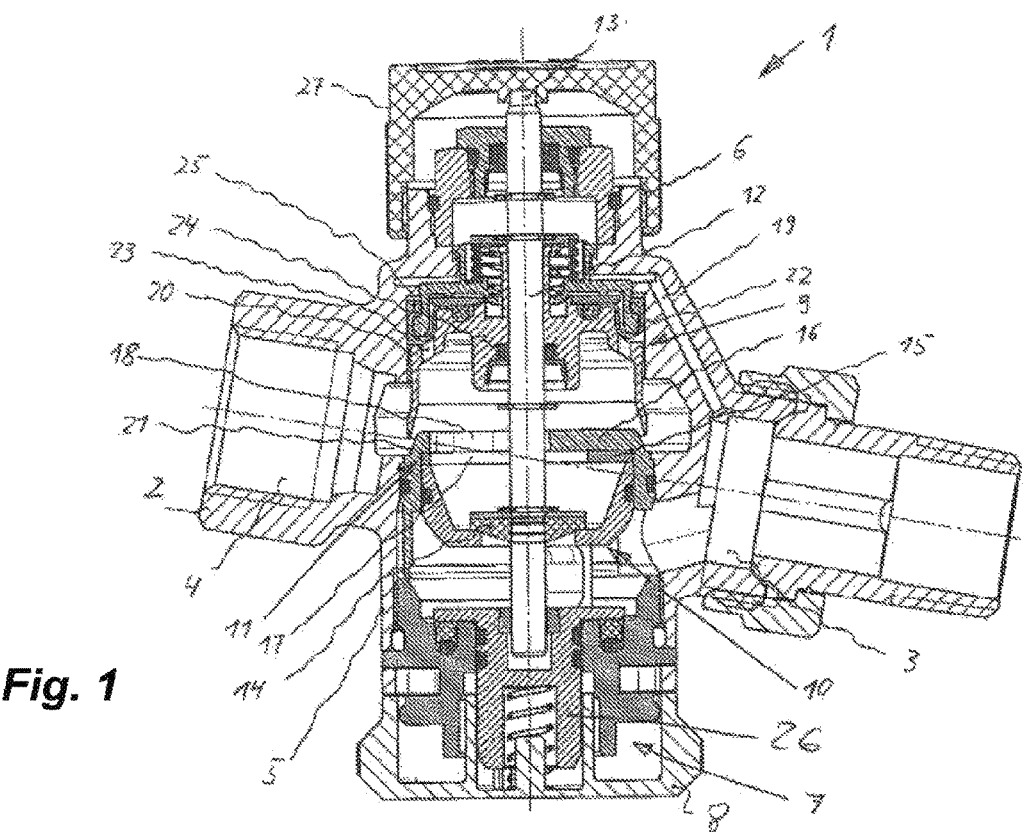
FIG. 1 is a central axial section through a control valve according to the invention in the assembled state.

The drawing shows a control valve 1 for controlling the rate of flow and the differential pressure in a liquid-conveying heating or cooling system. The control valve 1 consists substantially of a housing 2 with an inlet port 3 and an outlet port 4 for the flowing medium, as well as a connector fitting 5 therebetween. A controller 9, a first flow regulator 10 and a second flow regulator 11 are inserted into the connector fitting. The connector fitting 5 or parts on it have connection formations 6 for an adjuster 27 acting on the first flow regulator 10. In the illustrated embodiment, a protective cap fits over the end of the connector fitting 5 and is removed before first use, and an actuator is attached in its place. On the other hand, the connector fitting 5 has connection formations 7 for a manually operable knob 8 acting on the second flow regulator 11. In an inherently known manner, the controller 9 maintains the differential pressure constant via the first flow regulator 10 and the second flow regulator 11.

In the illustrated control valve according to the invention, the first flow regulator 10 is downstream of the inlet port 3 in the flow direction, followed by the second flow regulator 11, the controller 9, and finally the outlet port 4.

An axially displaceable spindle 12 is provided in the connector fitting 5 and has an actuating part 13 that projects out of the connector fitting 5 at the top of the drawing onto which an actuator or the like can be placed in order to move the spindle into different positions. A choke element 14 is fastened to the spindle 12 and is a part of the first flow regulator 10 and against which a valve seat works that is fixed relative to the housing so that a corresponding flow cross section or gap can be made to be smaller or larger. The spindle 12 extends through both the controller 9 and the second flow regulator 11.

Preferably, the spindle 12 is coaxial with the connector fitting 5.

The second flow regulator 11 is formed by a first disk 16 in the housing 2 or in the connector fitting 5 with at least one first flow opening 18 and a second disk 15 resting thereagainst (abutting the flow opening 18 from below in the drawing according to FIG. 1) and can be rotated relative thereto and has a second flow opening 17. The flow openings 17, 18 can be adjusted so as to overlap, thus forming different flow cross sections.

Figure 2:
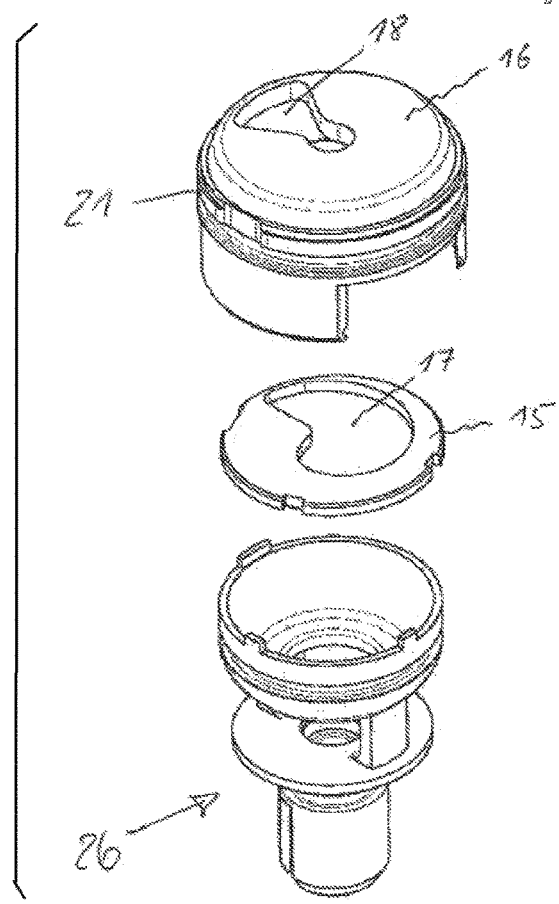
FIG. 2 is an oblique, exploded view of parts of the second flow regulator.

This embodiment can be seen in FIG. 2 in particular. This enables an especially flat construction to be achieved. The second disk 15 is coupled rotationally with a rotary driver 26 rotatable in the housing 2 or in the connector fitting 5. With a handle on the outside of the housing 2, the rotary driver 26 forms the manually operable knob 8 for adjusting the second flow regulator 11, as can be seen particularly in FIG. 1.

The spindle 12 is rotatable and axially displaceable in the housing 2, with the spindle 12 engaging tightly through the controller 9 and axially displaceable on it. The second flow regulator 11 is also engaged through by the spindle 12, but with movement clearance. Finally, the lower end of the spindle is axially displaceable and/or tightly held in the actuator 8, as can be seen clearly in FIG. 1. The controller 9 consists substantially of a flow restriction 20 axially displaceable on the spindle 12, and a housing-side seat 21 for this flow restriction 20, with the flow restriction 20 being limitedly displaceable toward and away from the seat 21, whereby the cross section of the flow passage can be changed by the controller 9.

The flow restriction 20 is coupled with a diaphragm 22 whose outer-edge bead 25 rests and/or is held liquid-tight against an inner wall of the housing 2 or of the connector fitting 5. In addition, the flow restriction 20 of the controller 9 has a seal 24 that rests tightly against the outer surface of the spindle 12.

Preferably, the seat 21 of the controller 9 and the disk 16 cooperating with the rotatable second disk 15 are integrally formed, as can be seen in FIG. 2.

In the control valve 1, the pressure prevailing between the inlet port 3 and the first flow regulator 10 is applied via a first pressure passage 19 formed in the housing 2 to one side and the pressure prevailing between the second flow regulator 11 and the controller 9 is applied via a second pressure passage 23 to the other side of the diaphragm 22 so that the diaphragm is acted upon accordingly by pressure and actuated in order to move the flow restriction 20 in order to appropriately influence the flow gap between flow restriction 20 and seat 21 in case of differences in pressure.

The invention is not limited to the illustrated embodiment, but rather can be varied in many respects within the framework of the disclosure. All of the individual and combined features disclosed in the description and/or drawing are regarded as being essential to the invention.

The invention claimed is:

1. A control valve for controlling the rate of flow and/or the differential pressure in a liquid-conveying heating or cooling system, comprising:
   a housing with an inlet port and an outlet port for the liquid;
   a connector fitting on the housing between the ports;
   a controller in the connector fitting;
   a first flow regulator in the connector fitting;
   a second flow regulator in the connector fitting;
   connection formations on the connector fitting;
   an adjuster engaging the connection formations and acting on the first flow regulator;
   an actuator acting on the manually operable second flow regulator, the controller maintaining the differential pressure constant via the first flow regulator and the second flow regulator, the first flow regulator being downstream of the inlet port in a flow direction, followed by the second flow regulator, the controller, and the outlet port; and
   a spindle axially displaceable in the connector fitting having an actuating part that projects out of the connector fitting and a choke element fastened to the spindle and forming part of the first flow regulator, the spindle extending axially through both the controller and the second flow regulator.

2. The control valve as defined in claim 1, wherein the second flow regulator is formed by a first disk in the housing or in the connector fitting with a first flow opening and a second disk resting against the first disk and that can be rotated relative thereto and has a second flow opening with the first and second flow openings forming one overlapping adjustable flow cross section.

3. The control valve as defined in claim 2, wherein the second disk is coupled rotationally with a rotary driver rotatable in the housing or in the connector fitting, and that the rotary driver includes a handle on the outside of the housing that forms a manually operable knob for adjusting the second flow regulator.

4. The control valve as defined in claim 1, wherein the spindle is rotatable and axially displaceable in the housing, with the spindle engaging through the controller in a sealed manner and being axially displaceable on it, and engaging through the second flow regulator with movement clearance and being axially displaceable and/or held in a sealed manner in the actuator.

5. The control valve as defined in claim 1, wherein the controller consists of a flow restriction axially displaceable on the spindle, and a housing-side seat therefor, with the flow restriction being limitedly displaceable toward and away from the seat, whereby the cross section of a flow passage can be changed by the controller.

6. The control valve as defined in claim 5, wherein the flow restriction is coupled with a diaphragm whose edge bead running circumferentially on the outside rests and/or is held liquid-tight against an inner wall of the housing or of the connector fitting.

7. The control valve as defined in claim 5, wherein the flow restriction of the controller has a seal that bears against the outer surface of the spindle.

8. The control valve as defined in claim 5, wherein the seat of the controller, the first disk, and the rotatable second disk are unitarily formed.

9. The control valve as defined in claim 1, wherein the pressurized liquid flowing through the control valve prevailing between the inlet port and the first flow regulator is conducted via a first pressure passage formed in the housing and/or connector fitting to one side of the controller or of a diaphragm of this controller, and that the pressure prevailing between the second flow regulator and the controller is applied to another side of the controller or of the diaphragm of this controller through a second pressure passage, with the second pressure passage being formed in a flow restriction of the controller that is between the second flow regulator and the diaphragm.

\* \* \* \* \*